United States Patent [19]

Santucci, deceased et al.

[11] Patent Number: 5,081,784
[45] Date of Patent: Jan. 21, 1992

[54] FISHING LURE RETRIEVAL APPARATUS

[76] Inventors: Nelo J. Santucci, deceased, late of Yuba City; John Lucich; by Delores Lucich, executrix, both of 944 Sanborn Rd., Yuba City, all of Calif. 95993

[21] Appl. No.: 484,990
[22] Filed: Feb. 26, 1990
[51] Int. Cl.⁵ .............................................. A01K 97/00
[52] U.S. Cl. .................................................... 43/17.2
[58] Field of Search ................... 43/17.2, 44.9, 44.91, 43/44.93

[56] References Cited

U.S. PATENT DOCUMENTS

| | | | |
|---|---|---|---|
| 2,208,240 | 7/1940 | Arnesen | 43/44.91 |
| 2,581,259 | 1/1952 | Keen | 43/44.91 |
| 2,888,771 | 6/1959 | Stephens | 43/44.91 |
| 3,628,279 | 12/1971 | Halone | 43/17.2 |
| 3,735,520 | 5/1973 | Jarrett | 43/17.2 |
| 3,798,825 | 3/1974 | Popeil | 43/44.9 |
| 3,867,783 | 2/1975 | Simpson | 43/44.91 |

Primary Examiner—Kurt Rowan
Assistant Examiner—James Miner
Attorney, Agent, or Firm—Leon Gilden

[57] ABSTRACT

An apparatus is set forth for the securement and retrieval of a fishing lure that is typically latched to an underwater environment. The apparatus includes an elongate housing formed with a first, elongate bore and a second intersecting tapered bore, wherein the second bore includes a spherical latching ball for latching the lure directed through the first bore. The housing includes a lock pin bore axially spaced from and parallel the first bore with a diametrically communicating slot mounted between the first bore, the lock pin bore, and an exterior wall of the housing to enable positioning of a fishing line within the first bore. The housing further includes a clip for securement of a retrieval line thereon apart from a fishing line. A modification of the invention includes the first bore and second bore of cylindrical configuration with resilient sleeves mounted within the bores.

2 Claims, 4 Drawing Sheets

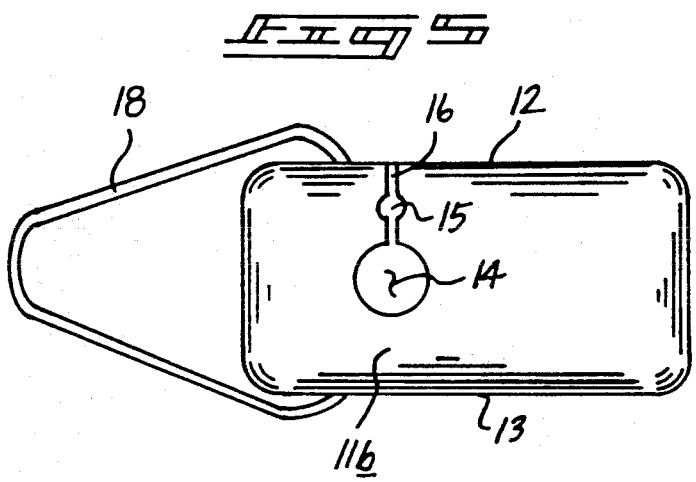
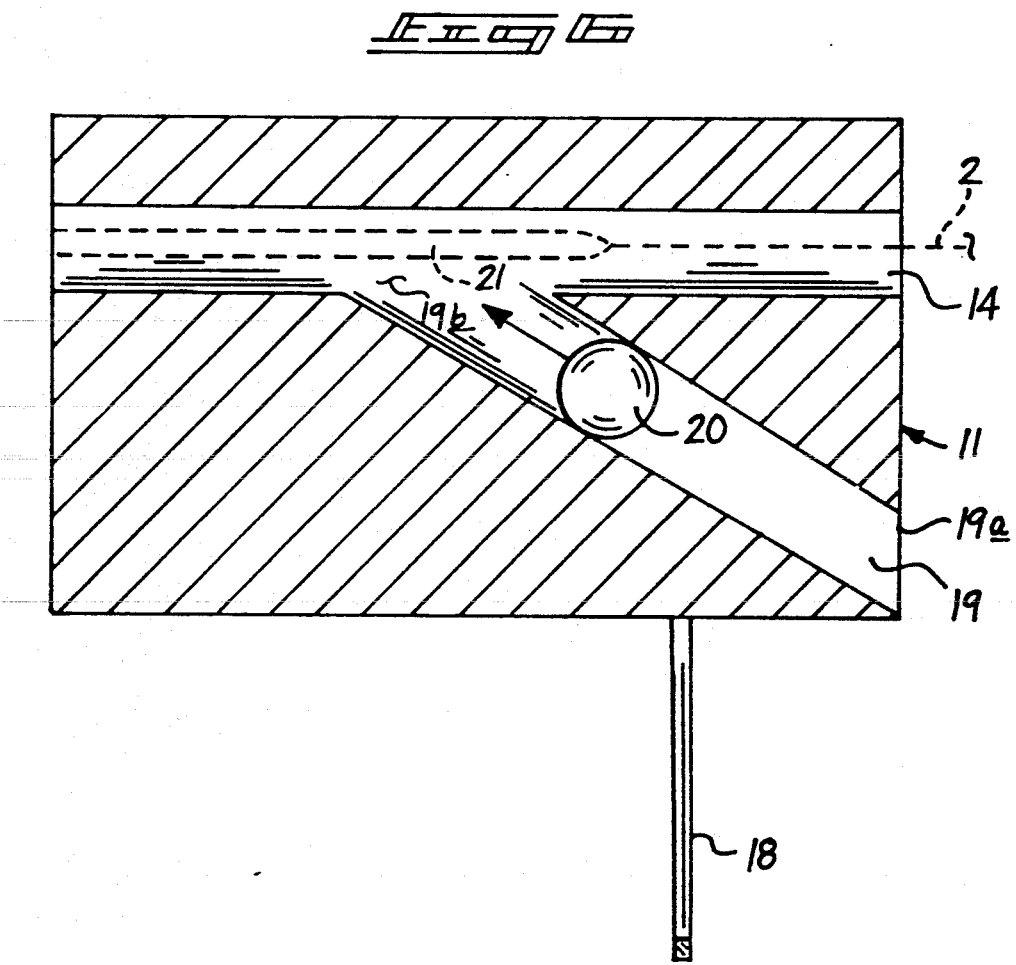

FISHING LURE RETRIEVAL APPARATUS

BACKGROUND OF THE INVENTION

1. Field of the Invention

The field of invention relates to fishing equipment, and more particularly pertains to a new and improved fishing lure retrieval apparatus wherein the same retrieves upon securement, fishing lures snagged and retained within an underwater environment.

2. Description of the Prior Art

Fishing lure retrieval devices have been utilized in an effort to retrieve fishing lures and the like which are hooked in underwater environments, such as in sunken logs, rocks, and the like. Elongate poles and weighted devices have been utilized in an effort to dislodge such lures with limited success and with resultant damage to an associated lure. Improved prior art devices have attempted to lodge an associated lure itself within a housing in an effort to retain the lure without damage thereto. An example of such a device may be found in U.S. Pat. No. 4,766,689 to Stinar wherein a cylindrical housing and a separate retrieval line secured to the housing is of a weighted construction to receive a lure directed therewithin and upon securement of the lure therewithin, the assembly is withdrawn to the surface of the water.

U.S. Pat. No. 4,598,493 to O'Brien sets forth a retrieving device utilizing a series of flexible chains mounted therefrom for jostling and impacting upon a lure in an effort to free the lure from a snagged condition.

U.S. Pat. No. 4,536,984 to Kowal sets forth a fishing shackle retrieval device wherein an elongate, weighted body includes a forward "U" shaped loop that is formed in an effort to secure an upper end of a closed loop of the fishing tackle in an effort to retrieve the same. The Kowal device, as opposed to that of the instant invention, does not provide for the surrounding securement and positive lodging of the fishing tackle within the retrieval organization in an effort to secure the same from a snagged condition.

U.S. Pat. No. 4,286,402 to Kuhn, et. al., sets forth a lure retrieval organization wherein an elongate body utilizes a series of links to contact the lure in its environment in an effort to free the same from an underwater condition.

U.S. Pat. No. 4,756,112 to Sprague sets forth a lure retrieval apparatus wherein a weighted body includes a slidable fishing line mounted therewithin, wherein a forward end of the fishing line and its securement to fishing tackle is securable to staggered hooks mounted forwardly of the body of the retrieval device in an effort to receive the associated lure assembly to the water surface.

As such, it may be appreciated that there is a continuing need for a new and improved fishing lure retrieval apparatus which addresses both the problems of effectiveness in construction and ease of use, and in this respect, the present invention substantially fulfills this need.

SUMMARY OF THE INVENTION

In view of the foregoing disadvantages inherent in the known types of fishing lure retrieval apparatus now present in the prior art, the present invention provides a fishing lure retrieval apparatus wherein the same provides for a bore to accommodate a fishing lure organization and secure the lure within the bore by a separate engagement member in an effort to receive the lure assembly to a user thereof. As such, the general purpose of the present invention, which will be described subsequently in greater detail, is to provide a new and improved fishing lure retrieval apparatus which has all the advantages of the prior art fishing lure retrieval apparatus and none of the disadvantages.

To attain this, the present invention includes an apparatus for the securement and retrieval of a fishing lure that is typically latched to an underwater environment. The apparatus includes an elongate housing formed with a first, elongate bore and a second intersecting tapered bore, wherein the second bore includes a spherical latching ball for latching the lure directed through the first bore. The housing includes a lock pin bore axially spaced from and parallel the first bore with a diametrically communicating slot mounted between the first bore, the lock pin bore, and an exterior wall of the housing to enable positioning of a fishing line within the first bore. The housing further includes a clip for securement of a retrieval line thereon apart from a fishing line. A modification of the invention includes the first bore and second bore of cylindrical configuration with a first resilient sleeve mounted within the first bore for protection of a lure directed therein, with a second resilient sleeve mounted within an upper end of the second cylindrical bore for retaining of the spherical latch ball therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure retrieval apparatus which has all the advantages of the prior art fishing lure retrieval apparatus and none of the disadvantages.

It is another object of the present invention to provide a new and improved fishing lure retrieval apparatus which may be easily and efficiently manufactured and marketed.

It is a further object of the present invention to provide a new and improved fishing lure retrieval apparatus which is of a durable and reliable construction.

An even further object of the present invention is to provide a new and improved fishing lure retrieval apparatus which is susceptible of a low cost of manufacture with regard to both materials and labor, and which accordingly is then susceptible of low prices of sale to the consuming public, thereby making such fishing lure retrieval apparatus economically available to the buying public.

Still yet another object of the present invention is to provide a new and improved fishing lure retrieval apparatus which provides in the apparatuses and methods of the prior art some of the advantages thereof, while simultaneously overcoming some of the disadvantages normally associated therewith.

Still another object of the present invention is to provide a new and improved fishing lure retrieval apparatus wherein the same provides for a lure receiving cavity within the retrieval apparatus to secure the lure assembly and minimize damage thereto during a retrieval procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a bottom orthographic view of the instant invention.

FIG. 6 is an orthographic view taken along the lines 6—6 of FIG. 4 in the direction indicated by the arrows.

DESCRIPTION OF THE PREFERRED EMBODIMENT

Figure 1:
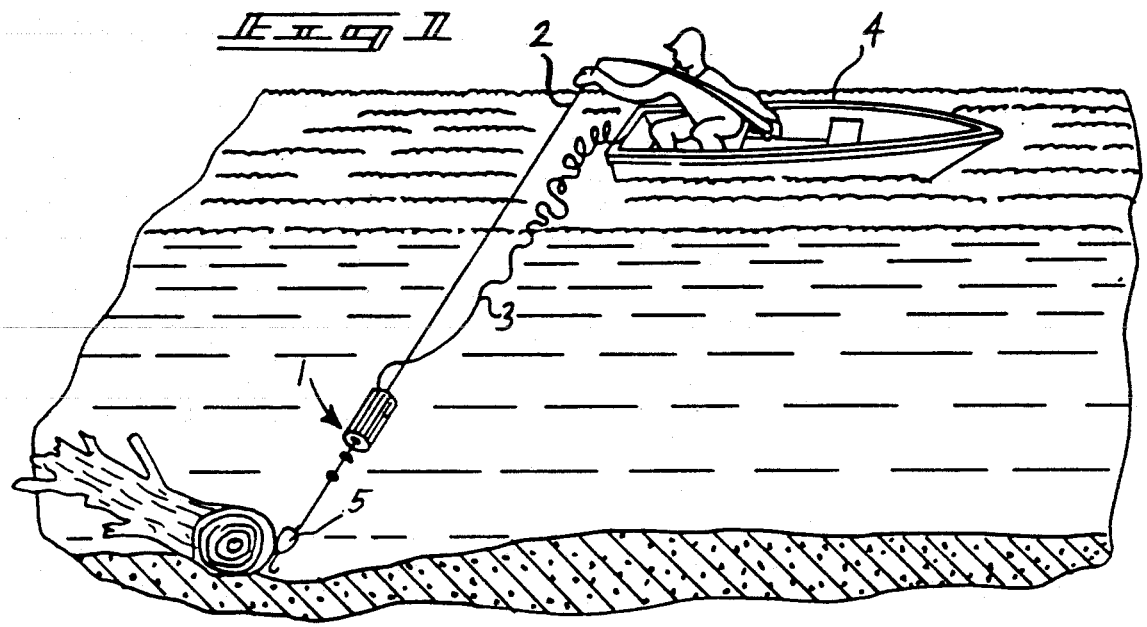
FIG. 1 is an isometric illustration of a prior art fishing lure retrieval apparatus in use.
Figure 2:
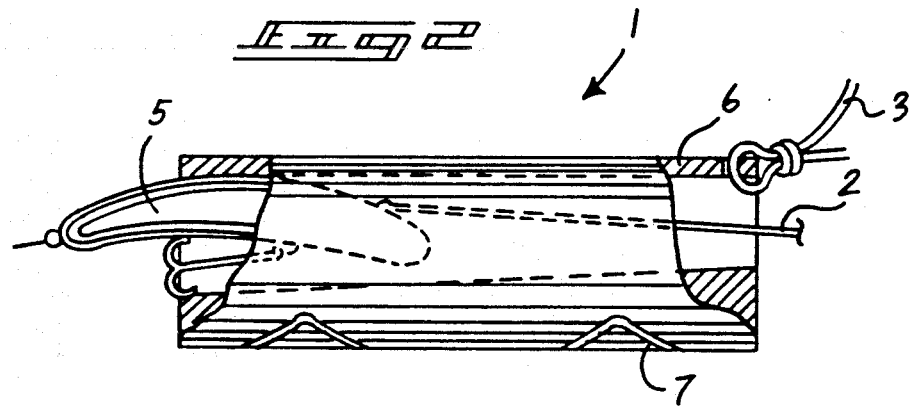
FIG. 2 is an orthographic view, partially in section, of a prior art retrieval tool, as illustrated in FIG. 1.
Figure 3:
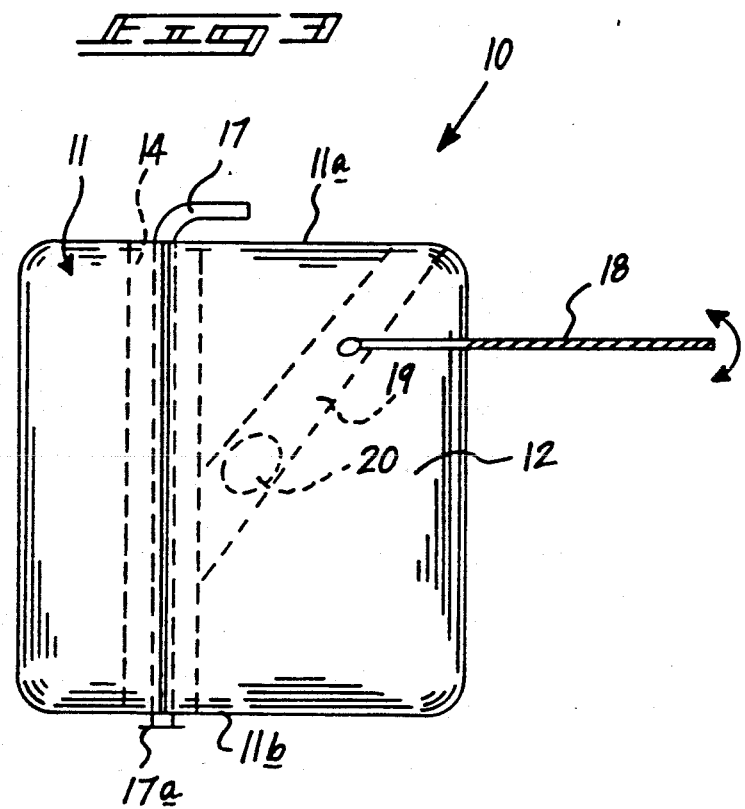
FIG. 3 is an orthographic view taken in elevation of the instant invention.
Figure 4:
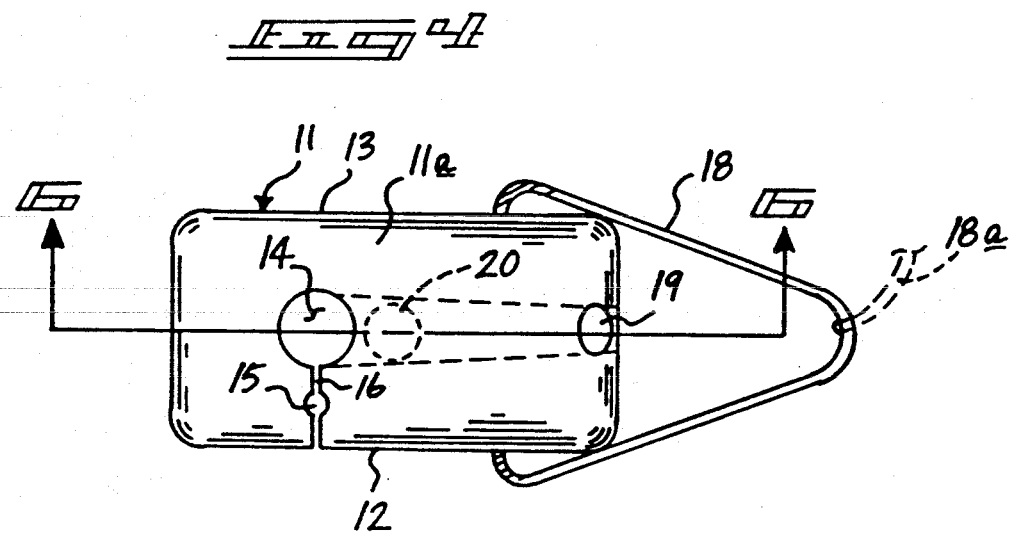
FIG. 4 is a top orthographic view of the instant invention.

With reference now to the drawings, and in particular to FIGS. 1 to 8 thereof, a new and improved fishing lure retrieval apparatus embodying the principles and concepts of the present invention and generally designated by the reference numerals 10 and 10a will be described.

FIG. 1 is illustrative of a typical use of a lure retrieval device 1 wherein a fishing line 2 is slidably directed therethrough, with a separate retrieval line 3 mounted to a cylindrical sleeve 6 defining the retrieval device. The sleeve 6 includes a fishing line insertion slot 7 for insertion of the fishing line 2 therewithin. An individual within a boat 4, in an effort to secure a lure 5 snagged at a bottom surface of the water environment, is utilizing the prior art device 1.

More specifically, the fishing lure retrieval apparatus 10 of the instant invention essentially comprises an elongate housing 11 defined geometrically as a parallelepiped, but may be assumed as one of a myriad of elongate configurations. The housing includes a top end surface 11a spaced from and parallel to a bottom end surface 11b, with a forward wall 12 parallel to and spaced from a rear wall 13. A first cylindrical bore 14 is axially aligned relative to the longitudinal dimension of the housing 11 and spaced medially of the forward and rear walls 12 and 13 respectively. A second cylindrical bore 15 is axially spaced from and parallel to the first cylindrical bore 14, with a diametrically aligned slot 16 orthogonally oriented and emanating through the forward wall 12 from the first cylindrical bore 14. The second cylindrical bore 15 is medially positioned relative to the slot 16, wherein a lock pin 17 provided with a lock pin foot 17a defined by a width substantially equal to or less than that of the slot 16 is positionable through the second bore 15 and the slot 16 and removable to allow a fishing line 2 to be directed through the slot 16 into the first cylindrical bore 14 to allow the housing 11 to be directed along the fishing line 2 in a manner similar to that as illustrated in FIG. 1. The housing 11 itself is formed of a weighted metallic material, such as babbitt metal, lead, or the like, to ensure the housing 11 is directed downwardly along the fishing line 2 to secure a associated lure 21, as illustrated in phantom in FIG. 6 within the first bore 14. A pivotally mounted triangular clip 18 is positioned within aligned apertures mounted within the forward and end walls 12 and 13, wherein a retrieval line 18a is secured to the forward end of the triangular clip 18 for retrieval of the apparatus subsequent to securement of a fishing lure therewithin.

A tapered bore 19 originates from the top end surface 11a and is directed interiorly at an angle to intersect the first cylindrical bore 14. The tapered bore 19 is narrower at its upper end rather than its lower end, wherein a spherical lock ball 20 is prevented from being withdrawn from the bore 19 from its upper end and the lock ball 20 subsequent to a receiving of the lure 21 interiorly of the first bore 14 and is directed towards the lure 21, as illustrated in FIG. 6 in the direction of the arrow, to engage and impinge upon the lure 21 and thereby latch the lure 21 interiorly of the first bore 14 at the lower intersection end 19b of the tapered bore 19 remote from the entrance opening 19a.

Figure 7:
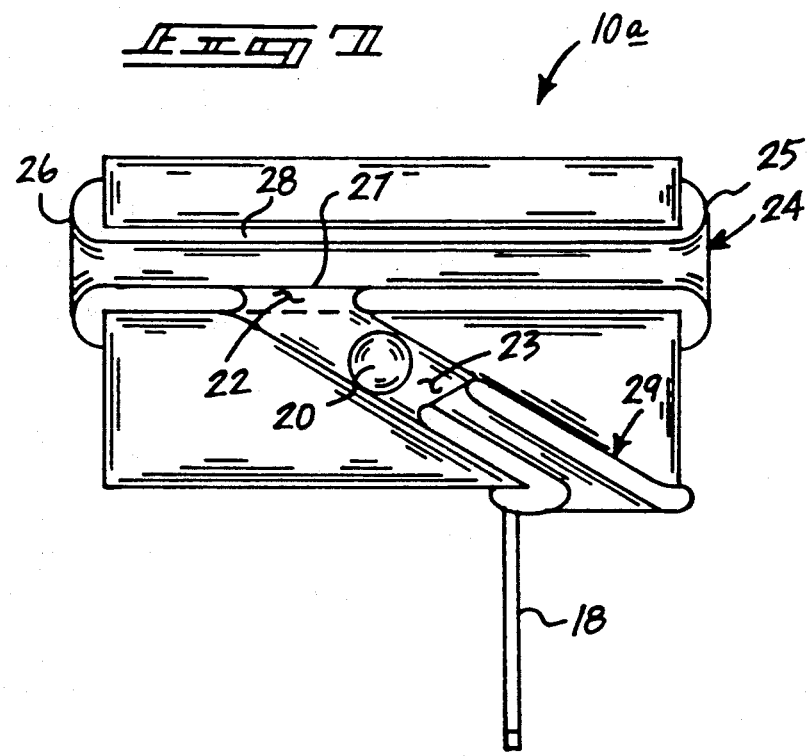
FIG. 7 is an orthographic cross-sectional view of a modified lure retrieval apparatus utilized by the instant invention.
Figure 8:
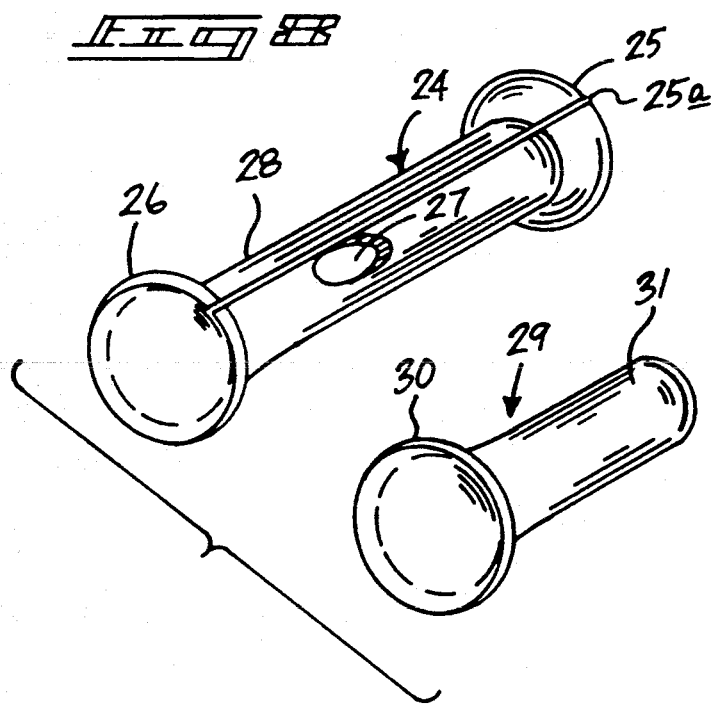
FIG. 8 is an isometric illustration of insert members utilized by the retrieval apparatus, as illustrated in FIG. 7.

Reference to FIGS. 7 and 8 illustrate a modified fishing lure retrieval apparatus 10a, wherein a first cylindrical bore 22 is intersected by a second cylindrical bore 23 in a like manner as the first fishing lure apparatus 10, with respect to bores 14 and 19, however the second cylindrical bore 23 in the modified embodiment is cylindrical rather than tapered. It should also be noted that the same bore 15 and associated slot 16 are in fact associated with the first cylindrical bore 22 to enable reception of a fishing line therewithin. The first and second respective cylindrical bores 22 and 23 utilize a respective first and second insert 24 and 29 respectively. The first insert 24 includes an upper flared end 25, a lower flared end 26, a central sleeve 28, and an insert aperture 27. The central sleeve 28 is of an axial length equal to the longitudinal axial length of the cylindrical bore 22 and provided with the insert aperture 27 to coincide with the second cylindrical bore 23 lower end intersecting the first cylindrical bore 22 to enable the locking spherical ball 20 to be received within the first cylindrical bore 22 and latch a lure therewithin in a manner comparable to that as illustrated in FIG. 6. The inserts 24 and 29 are formed of a relatively soft polymeric type type material for enhanced protection of the fishing lure and fishing line directed therethrough. Further, the first insert 24 is provided with a longitudinal slot 25a coincident with the slot 16 to receive the fishing line therethrough for insertion of the line within the first cylindrical bore 22. The second insert 29 is defined by a sleeve member 31 of a length substantially equal to one-half to one-third that of the second bore 23 and acts as a plug to prevent the lock ball 22 from escaping the second bore 23. The flared upper and lower ends 25 and 26 of the first insert are provided to enable ease of passage of the fishing tackle and line therethrough, while the flared entrance end 30 of the second insert 29 enhances water flow therethrough to further enhance the securement of the lock ball 22 against an associated lure secured within the first bore. It should be understood that in both the first and second embodiments 10 and 10a respectively, the bore is directed completely through the housing to avoid the creation of air pockets and the like within the angular bore containing the spherical lock ball and enhance the locking action of the ball against a fishing lure secured within the elongate axial bore, either 14 or 22 within the respective embodiments 10 and 10a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing lure retrieval apparatus for securing and retrieving a fishing lure organization, wherein the apparatus comprises,
   an elongate housing including an upper end wall, a lower end wall, a forward wall, and a rear wall, and
   a through-extending first bore longitudinally directed through the housing and orthogonally aligned relative to the upper end wall and lower end wall, and
   a slot diametrically aligned with the first bore for receiving and directing a fishing line secured to said fishing lure organization, wherein said slot is directed through said forward wall in communication with said first bore for receiving and directing a fishing line secured to said fishing lure organization through said slot to said first bore, and
   a second bore including an upper opening directed through said housing and a lower end intersecting the first bore, wherein the second bore is angularly intersecting the first bore at an acute angle thereto, and
   a lock means configured for movement along said second bore for engaging and locking the fishing lure organization when received within said first bore, and
   wherein the lock means comprises a spherical lock ball, and the second bore is tapered from a narrowed upper end including said upper opening, wherein the upper opening defines a diameter less than that defined by said lock ball, and said lower end of said second bore defined as a diameter greater than said lock ball preventing said lock ball from exiting said housing through said upper opening, and
   wherein said slot includes a further bore, said further bore directed through and aligned with said slot, wherein the bore further defines an axis positioned medially of said slot, and a lock pin slidably receivable within said slot to secure said fishing line within said first bore when directed through said slot, and
   including a triangular clip including lower terminal ends pivotally mounted through said forward wall and said rear wall for securement of a retrieval line to said clip, and
   wherein a first polymeric insert is securable within said first bore, said first insert includes a central sleeve defining an axial length equal to an axial length defined by said first bore, and said sleeve including a flared upper end and a flared lower end extending exteriorly of said upper end wall and said lower end wall respectively, and said sleeve further including an insert aperture aligned with the lower end of the second bore, and the sleeve further including an elongate slot portion aligned with said slot, wherein said slot portion is offset relative to said insert aperture.

2. An apparatus as set forth in claim 1 further including a second insert receivable within said second bore, wherein the second insert includes a second insert sleeve defining an axial length less than that defined by said second bore to contain the lock ball within said second bore.

* * * * *